(12) United States Patent
Heiskanen et al.

(10) Patent No.: US 11,504,956 B2
(45) Date of Patent: Nov. 22, 2022

(54) METHOD FOR THE PRODUCTION OF A COATED PAPER, PAPERBOARD OR FILM AND A COATED PAPER, PAPERBOARD OR FILM

(71) Applicant: Stora Enso OYJ, Helsinki (FI)

(72) Inventors: Isto Heiskanen, Imatra (FI); Esa Saukkonen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 749 days.

(21) Appl. No.: 16/471,983

(22) PCT Filed: Dec. 21, 2017

(86) PCT No.: PCT/IB2017/058246
§ 371 (c)(1),
(2) Date: Jun. 20, 2019

(87) PCT Pub. No.: WO2018/116223
PCT Pub. Date: Jun. 28, 2018

(65) Prior Publication Data
US 2020/0023627 A1 Jan. 23, 2020

(30) Foreign Application Priority Data

Dec. 22, 2016 (SE) .................................. 1651734-4

(51) Int. Cl.
| | | |
|---|---|---|
| *D21F 5/00* | (2006.01) | |
| *B32B 29/02* | (2006.01) | |
| *D21C 9/18* | (2006.01) | |
| *D21H 11/18* | (2006.01) | |
| *D21H 19/34* | (2006.01) | |
| *D21H 23/26* | (2006.01) | |

(52) U.S. Cl.
CPC ............... *B32B 29/02* (2013.01); *D21C 9/18* (2013.01); *B32B 2307/7242* (2013.01); *D21F 5/00* (2013.01); *D21H 11/18* (2013.01); *D21H 19/34* (2013.01); *D21H 23/26* (2013.01)

(58) Field of Classification Search
CPC ........ D21H 19/10; D21H 11/18; D21H 21/16; D21H 5/00; D21H 27/10; D21H 23/02; D21H 19/34; D21H 23/26; B32B 2307/7242; B32B 29/02; D21C 9/18; D21F 5/00
USPC ........................................ 428/537.1; 162/109
See application file for complete search history.

(56) References Cited

U.S. PATENT DOCUMENTS

| | | |
|---|---|---|
| 2011/0281487 A1 | 11/2011 | Mukai et al. |
| 2013/0017349 A1 | 1/2013 | Heiskanen et al. |
| 2013/0202870 A1 | 8/2013 | Malmborg et al. |
| 2014/0255688 A1 | 9/2014 | Salminen et al. |
| 2014/0288296 A1 | 9/2014 | Qi et al. |
| 2015/0114581 A1 | 4/2015 | Kinnunen et al. |
| 2015/0191036 A1 | 7/2015 | Ratnakumar et al. |
| 2015/0315747 A1 | 11/2015 | Heiskanen et al. |
| 2016/0016717 A1 | 1/2016 | Toubeau et al. |
| 2016/0130757 A1 | 5/2016 | Mikami et al. |
| 2016/0176989 A1 | 6/2016 | Laukkanen et al. |

FOREIGN PATENT DOCUMENTS

| | | |
|---|---|---|
| CN | 102695832 A | 9/2012 |
| CN | 102933767 A | 2/2013 |
| JP | 2010167411 A | 8/2010 |
| JP | 2016517901 A | 6/2016 |
| JP | 2017066545 A | 4/2017 |
| WO | 2009091406 A1 | 7/2009 |
| WO | 2014147295 A1 | 9/2014 |
| WO | 2015011512 A1 | 1/2015 |
| WO | 2016097964 A1 | 6/2016 |

OTHER PUBLICATIONS

International Searching Authority, Written Opinion of the International Searching Authority, PCT/IB2017/058246, dated Dec. 21, 2017.
International Searching Authority, International Search Report, PCT/IB2017/058246, dated Dec. 21, 2017.
Aulin, et al., "Oxygen and oil barrier properties of microfibrillated cellulose films and coatings," Cellulose (2010), 17:559-574.
Lavoine, N. et al., "Microfibrillated cellulose—Its barrier properties and applications in cellulosic materials: A review," Carbohydrate Polymers 90 (2012), pp. 735-764.
Rodionova, G. et al., "The Formation and Characterization of Sustainable Layered Films Incorporating Microfibrillated Cellulose (MFC)," BioResources 7(3), pp. 3690-3700.
Kumar, et al., "Comparison of nano- and microfibrillated cellulose films," Cellulose (2014), 21:3443-3456. (two abstracts only).
Chinga-Carrasco, G., "Cellulose fibres, nanofibrils and microfibrils: The morphological sequence of MFC components from a plant physiology and fibre technology point of view," Nanoscale Research Letters 2011, 6:417, pp. 1-7.
Fengel, D., "Ultrastructural behavior of cell wall polysaccharides," Tappi J., Mar. 1970, vol. 53, No. 3.

*Primary Examiner* — Mark Halpern
(74) *Attorney, Agent, or Firm* — Greer, Burns & Crain, Ltd.

(57) ABSTRACT

The present invention relates to a method for the production of a coated paper, paperboard or film, wherein the method comprises the steps of; providing a first suspension comprising cellulose fibers, applying the first suspension on a substrate to form a fibrous web, wherein the web has a first and a second side, providing a second suspension comprising micro fibrillated cellulose, applying the second suspension either to the first side of the fibrous web or to a surface of a drying equipment and conducting said fibrous web through the drying equipment whereby the second suspension is added to the first side of the web forming the coated paper, paperboard or film. The invention also relates to a paper, paperboard or film produced according to the method.

11 Claims, 1 Drawing Sheet

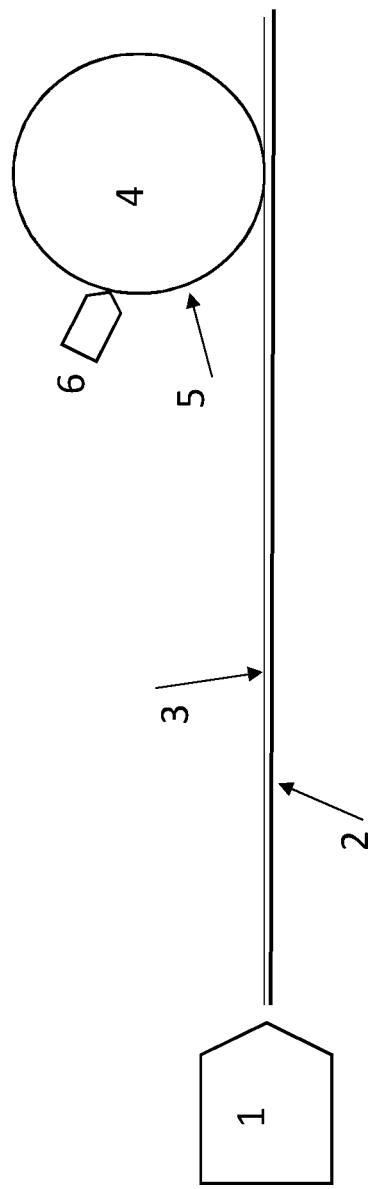

METHOD FOR THE PRODUCTION OF A COATED PAPER, PAPERBOARD OR FILM AND A COATED PAPER, PAPERBOARD OR FILM

This application is a U.S. National Phase under 35 U.S.C. § 371 of International Application No. PCT/IB2017/058246, filed Dec. 21, 2017, which claims priority under 35 U.S.C. §§ 119 and 365 to Swedish Application No. 1651734-4, filed Dec. 22, 2016.

TECHNICAL FIELD

The present invention relates to a method for producing a coated paper, paperboard or film wherein said coating comprises microfibrillated cellulose and a coated paper, paperboard or film produced according to the method.

BACKGROUND

When producing packages from paper, paperboard and making films to be used in connection with packages, it is often important that they have good barrier properties. Depending on the end use of the package different demands of the barrier properties and the package per se is needed.

Microfibrillated cellulose (MFC) is known to be able to give both good strength properties but also provide a paper, paperboard or film with barrier properties. However, there are big challenges when using microfibrillated cellulose due to its gel forming properties at higher consistencies. A challenge is thus that large amounts of water needs to be added when microfibrillated cellulose is to be added.

When producing films it is today possible to produce good barrier films comprising high amounts of microfibrillated cellulose. This is for example described in Aulin et al., Oxygen and oil barrier properties of microfibrillated cellulose films and coatings, Cellulose (2010) 17:559-574, Lavoine et al., Microfibrillated cellulose—Its barrier properties and applications in cellulosic materials: A review, Carbohydrate polymers 90 (2012) 735-764 and Kumar et al., Comparison of nano- and microfibrillated cellulose films, Cellulose (2014) 21:3443-3456.

It is however difficult to produce films, especially thin films, comprising high amounts of microfibrillated cellulose that both has good barrier properties and high strength, especially high tear strength. One potential solution would be produce a film that comprises both microfibrillated cellulose and longer cellulose fibers. It has however been found that the presence of longer fibers will deteriorate the barrier properties of the film. Also, the microfibrillated cellulose tend bind strongly to the longer fibers leading to the fibers are cut (instead of stretched) during tearing conditions which will not improve the tear strength of the film. Furthermore, the cellulose fibers might affect the thickness of the film.

Another solution could be to add strength enhancing chemicals to the film. The use of chemicals may affect the barrier properties of the film in a negative way. Also, the use of chemicals will also increase the production cost of the film.

There is thus a need to produce a paper, paperboard or film comprising microfibrillated cellulose that has both good barrier and strength properties and that can be produced in an efficient way.

SUMMARY

It is an object of the present invention to provide a method for providing at least one side of a paper, paperboard or film with a microfibrillated coating layer, which method eliminates or alleviates at least some of the disadvantages of the prior art methods.

The invention is defined by the appended independent claims. Embodiments are set forth in the appended dependent claims and in the following description.

The present invention relates to a method for the production of a coated paper, paperboard or film, wherein the method comprises the steps of: providing a first suspension comprising cellulose fibers, applying the first suspension on a substrate to form a fibrous web, wherein the web has a first and a second side, providing a second suspension comprising microfibrillated cellulose, applying the second suspension to a surface of a drying equipment and conducting said fibrous web through the drying equipment whereby the second suspension is added to the first side of the web forming the coated paper, paperboard or film.

With cellulose fibers is meant any kind of cellulose fibers including microfibrillated cellulose.

The first suspension preferably comprises between 0.01 weight-% to 20 weight-% of microfibrillated cellulose based on total dry weight of the solids of the suspension. When producing a paper or paperboard product the fibrous web may comprise microfibrillated cellulose to provide the paper or paperboard with improved strength properties.

The first suspension preferably comprises between 70 weight-% to 100 weight-% of microfibrillated cellulose based on total dry weight of the solids of the suspension. Thus, a MFC film is produced comprising high amount of MFC, preferably between 70-100% by weight of MFC, this relates to the amount of MFC in the film per se before eventual coating layers have been added.

The first suspension preferably comprises microfibrillated cellulose, wherein said microfibrillated cellulose has a Schopper-Riegler (SR) value below 90, preferably between 70-85. A large part of the microfibrillated cellulose of the first suspension, preferably more than 50% of the microfibrillated cellulose of the first suspension has a SR value below 90. Thus, the first suspension comprises MFC that is quite coarse and/or long and can be seen as an intermediate MFC quality.

The second suspension preferably comprises 70 weight-% to 100 wt-% of microfibrillated cellulose based on total dry weight of the suspension. Thus, the coated applied on the fibrous web comprises high amounts of MFC. This relates to the amount of MFC in the coating per se before eventual additional coating layers have added.

The second suspension preferably comprises microfibrillated cellulose having a Schopper-Riegler (SR) value above 95. A large part of the microfibrillated cellulose of the second suspension, preferably more than 50% of the microfibrillated cellulose of the second suspension has a SR value above 95. Thus, the second suspension comprises MFC that is fine and/or short.

The second suspension is preferably applied in an amount leading to that a coating having a grammage of 0.1-8 gsm, preferably between 0.3-4 gsm is formed. The formed coating of the paper, paperboard or film is very thin. It has been found that by adding a thin coating to a paper, paperboard or MFC film the barrier properties of the paper, paperboard or film is improved.

The method may further comprises the step of dewatering the formed fibrous web to a dry content of 25-90% by weight, preferably between 40-90% by weight, even more preferred between 50-80% by weight before the web is conducted through the drying equipment. It may be important that the dry content of the fibrous web is not too low so that the fibrous web can be conducted through the drying equipment and the addition of the second suspension and formation of the coating layer is possible. If the dry content is too low the fibrous web may break when being conducting through the drying equipment. If the dry content is too high the process is not cost efficient and the adhesion of the coating layer may be deteriorated.

The drying equipment used is preferably a contact drying equipment such as a Yankee drying cylinder, a metal belt dryer, a plastic belt dryer or a Condebelt drying equipment.

The method may further comprise the step of applying a surface size, foam coating or a dispersion coating comprising a polymer to any of the sides of the paper, paperboard or film. By applying a surface size, a foam coating and/or a dispersion coating to the paper, paperboard or film it is possible to improve e.g. the heat-sealing properties and/or water resistance or water and moisture barrier properties of the paper, paperboard or film.

The method may further comprise the step of applying a polymer layer to the side of the paper, paperboard or film that has not been in direct contact with the drying equipment, either through lamination of a polymer film or by extrusion coating of a polymer. By adding a polymer layer a paper, paperboard or film having e.g. heat-sealing properties and/or barrier properties can be produced at a low cost.

The present invention also relates to a coated paper or paperboard obtained by the method described above.

The present invention also relates to a coated film comprising microfibrillated cellulose obtained by the method described above.

The coated film preferably has a grammage below 45 gsm, preferably below 35, even more preferred below 30 gsm. The film preferably has a density of above 700 kg/cm$^3$. The film preferably has an Oxygen Transmission Rate (OTR) value (23° C., 50% Relative Humidity) below 100 cc/m$^2$*day*atm according to ASTM D-3985, a tear resistance above 2.0 Nm$^2$/g measured as the geometric MD/CD mean value according to ISO 1974 (Elmendorf method) and the first side of the film preferably has a surface roughness PPS value below 2 μm according to ISO 8791-4, preferably below 1.5 μm, most preferably below 1 μm.

The film according to the present invention is preferably a thin translucent or transparent film, with a high density, high smoothness, good barrier properties and good strength.

DETAILED DESCRIPTION

It has been found that it is possible to produce a coated paper or paperboard product having both barrier properties and good strength properties. The coating is applied by adding a second suspension comprising microfibrillated cellulose to a surface of a drying equipment. In this way the dry content of the microfibrillated cellulose added is increased compared to if the microfibrillated cellulose was sprayed or added directly to the fibrous web. Thus, the amount of water added to the paper or paperboard is decreased. Also, the surface of the paper or paperboard produced will have improved gloss since the coating layer will have a very glossy surface from the surface of the drying equipment.

Furthermore, it has surprisingly been found that it is possible to produce a film having good barrier and strength properties by applying a coating comprising MFC in a drying equipment during production of the film. By applying a second suspension comprising MFC to a surface of a drying equipment and conducting the formed fibrous web comprising cellulose fibers through the drying equipment in such way that the fibrous web is coated with the added second suspension film having good barrier properties is produced. In this way the fibrous web is both coated with a coating layer comprising the second suspension at the same time as the film is dried. By applying a coating layer by adding a suspension to the surface of a drying equipment the coating layer tends to stays on the surface of the fibrous web, i.e. the second suspension will not penetrate into the fibrous web. Furthermore, it is possible to increase the production speed of the film according to the invention.

Another advantage with the present invention is that the dewatering of the web is improved. By making a coated film, preferably a MFC film having more than one layers comprising MFC, it has been shown that the dewatering is improved. The dewatering of the first suspension on the wire is easier when the web is not that thick. The second suspension is thereafter added and the fibrous web is dried in the drying equipment.

The fibrous web is formed by applying the first suspension onto a substrate. The substrate may be a porous wire in a paper making machine. It is thus possible to apply the method in the wet end of a paper making machine. The formed fibrous web may then be removed from the wire and thereafter conducted through the drying equipment, preferably on the support. With paper making machine is meant any kind of paper making machine known to a person skilled in the art used for making paper, paperboard, tissue or any similar products.

The substrate may also be a paper or paperboard substrate thus forming a paperboard or paper substrate coated with the MFC film according to the invention.

The substrate may also be a polymer or metal substrate. The fibrous web is the preferably casted onto the polymer or metal substrate. The casted fibrous web can then be dried in any conventional manner and thereafter peeled off from the substrate. The peeled off fibrous web is thereafter conducted through the drying equipment according to the present invention. It may also be possible to conduct the casted fibrous web through the drying equipment on the support on which it has been casted.

The drying equipment is preferably a contact drying equipment. Preferred drying equipment's are Yankee Cylinder, metal belt dryer, a plastic belt dryer or a Condebelt drying equipment. Yankee Cylinders are normally used for drying tissue papers that is a very porous material. When using a Yankee Cylinder for drying substrates, the liquid in the substrates flows through the substrate towards the Yankee cylinder, i.e. towards the heat and the steam that is formed during the drying. The liquid of the product in our case also comprises microfibrils which leads to that an increased concentration of microfibrils is achieved on the smoothened surface of the paper, paperboard or film. This further improves the smoothness of the surface of the paper, paperboard or film which leads to improved barrier properties as well as improved optical properties and transparency of the paper, paperboard or film. Metal belt drying equipment or metal belt dryer is normally used when drying paper or paperboard products. The metal belt dryer uses a smooth heated metal belt to dry the paper, paperboard or film where the paper, paperboard or film will be in direct contact with the heated metal belt. The metal dryer is very efficient due to the use of high temperature and good water removal. With a metal belt dryer it is also possible to dry both sides of the paper, paperboard or film at the same time. A plastic belt dryer can also be used. A heated plastic belt is then used in a similar manner as for the metal belt dryer. Condebelt drying equipment is normally used when drying paper or paperboard products. The use of Condebelt drying process increases the drying rates significantly compared to conventional drying cylinders. The higher drying rates are achieved by higher contact temperatures, higher pressure applied between the hot surface and the product being dried. The first side of the web according to the present invention will then be in direct contact with the heated belt of the Condebelt drying equipment. The contact time needed in the direct contact equipment depends on the temperature and the dry content of the web.

The second suspension is added to a surface of the drying equipment, preferably to the surface of a cylinder or drying belt of the drying equipment. The second suspension is added by contact or non-contact coating methods such as spraying. The coating may also be added by any known way and thereafter being leveled on the surface by suitable equipment, such as a doctor blade. The added second suspension forms an even coating on the surface of the drying equipment. The added second suspension is thereafter added to the first side of the fibrous web and the coated fibrous web is thereafter dried passing through the drying equipment.

The dry content of the second suspension being added to the surface of the drying equipment is preferably between 1-10% by weight. The dry content of the added second suspension is then increased on the drying equipment before being added to the fibrous web.

The surface of the drying equipment will be in contact with the first side of the fibrous web, meaning indirect contact since the second suspension coating will be located between the first side of the substrate and the drying equipment.

The temperature used during drying of the fibrous web and application of the coating layer is preferably between 70-190° C., preferably above 100° C., even more preferably between 110-190° C.

The optical properties, such as the gloss of the paper, paperboard or film, are also improved. This could be visually seen after drying the paper, paperboard or film in the contact drying equipment.

With paper or paperboard is meant any kind of paper or paperboard product. The paper or paperboard comprises cellulose fibers. Any kind of cellulose fibers can be used, i.e. both hardwood and/or softwood fibers can be used. The cellulose fibers can made from any kind of pulp fibers, e.g. chemical pulp fibers such as kraft pulp fibers, mechanical pulp fibers and/or thermomechanical pulp fiber.

With film is meant a thin substrate with good gas, aroma or grease or oil barrier properties, preferably oxygen barrier properties. The coated film preferably has a basis weight of less than 40 g/m$^2$ and a density in the range from 700-1400 kg/m$^3$. The oxygen transmission rate (OTR) value of a coated film having a grammage of 30 g/m$^2$ at 23° C. and a relative humidity of 50%, is preferably below 30 cc/m$^2$*day*atm according to ASTM D-3985.

The first suspension preferably comprises between 0.01 weight-% to 20 weight-% of microfibrillated cellulose based on total dry weight of the solids of the suspension. When producing a paper or paperboard product the fibrous web may comprise microfibrillated cellulose to provide the paper or paperboard with improved strength properties. It is preferred that the first suspension when producing a coated paper or paperboard product also comprises other cellulosic fibers than microfibrillated cellulose. It is preferred that the first suspension comprises 80-99 weight-% of cellulosic fibers based on the total dry weight of the solids of the suspension (besides the microfibrillated cellulose added). It is preferred that the first suspension comprises 90-100 weight-% of cellulosic fibers based on the total dry weight of the solids of the suspension including microfibrillated cellulose.

The cellulose fibers of the first suspension when producing a film is preferably microfibrillated cellulose. It is thus possible to produce a film only comprising microfibrillated cellulose, i.e. without the presence of any other cellulose fibers.

The first suspension preferably comprises between 70 weight-% to 100 weight-% of microfibrillated cellulose based on total dry weight of the suspension. Thus, the MFC film produced comprises high amount of MFC, preferably between 70-100% by weight of MFC, this relates to the amount of MFC in the film per se before eventual coating layers have been added.

The microfibrillated cellulose of the first suspension preferably has a Schopper-Riegler (SR) value below 90, preferably between 70-90 or between 70-85. Preferably at least 50% of the MFC of the first suspension has a SR value below 90, more preferred more than 75% or even more preferred more than 85% of the MFC. Preferably at least 50% of the MFC of the first suspension has a SR value between 70-85, more preferred more than 75% or even more preferred more than 85% of the MFC. The Schopper-Riegler value can be obtained through the standard method defined in EN ISO 5267-1. The first suspension may also comprise microfibrillated cellulose having a Schopper-Riegler (SR) value above 90. The first suspension may also comprise longer cellulose fibers, either hardwood or softwood fibers, preferably kraft pulp softwood fibers. The first suspension may also comprise other additives, such as pigments, carboxymethylcelluose (CMC), retention chemicals, starch etc.

The second suspension preferably comprises between 70 weight-% to 100 weight-% of microfibrillated cellulose based on total dry weight of the suspension. Thus, the coating layer of the paper, paperboard or film produced comprises high amount of MFC, preferably between 70-100% by weight of MFC, this relates to the amount of MFC in the coating layer per se before eventual additional coating layers have been added. The microfibrillated cellulose of the first suspension preferably has a Schopper Riegler (SR) above 95, preferably above 97. Preferably at least 50% of the MFC of the second suspension has a SR value above 95, more preferred more than 75% or even more preferred more than 85% of the MFC. Thus the second suspension comprises MFC that is very fine. The Schopper Riegler value can be obtained through the standard method defined in EN ISO 5267-1.

The second suspension may also comprise other additives, such as pigments, carboxymethylcelluose (CMC), retention chemicals, starch, optical brightening agents, dyes, lubricants, hydrophobic agents, wet or dry strength additives, bioactive chemicals, dispersants, etc.

The second suspension is preferably applied in an amount forming a coating with a grammage of 0.1-8 gsm. The formed coating on the paper, paperboard or film is very thin. It has been found that by adding a thin coating to a paper, paperboard or film the barrier properties of the paper, paperboard or film is improved.

The dry content of the web conducted to the drying equipment is preferably between 40-90% by weight, more preferably between 50-80% by weight. The web formed on the wire may thus be dried or dewatered in any conventional way, e.g. by pressing or conventional cylinder drying, by using vacuum and/or by the use of hot air, in order for it to have the appropriate dry content before it is being conducted to the direct drying equipment.

The dry content of the produced coated paper, paperboard or film after being subjected to drying in the drying equipment is preferably above 70% by weight, even more preferably above 80% by weight, preferably between 85-97% by weight. The produced coated paper, paperboard or film may also be dried in additional drying steps after being dried in the direct drying equipment. Any conventional drying equipment may be used. If additional layers such as polymer or metal layer were to be added to the coated paper, paperboard or film the dry content of the paper, paperboard or film is of great importance.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemithermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

The first fibrous suspension may also comprise a wet strength agent, i.e. a wet strength agent may be added to the suspension. Wet strength chemicals improves the strength properties of the web and thus of the paper, paperboard or film by crosslinking the microfibrillated. Different wet strength agents can be added such as ureaformaldehyde (UH), melamineformaldehyde (MF), polyamide-epichlorohydrin (PEA), glyoxal and/or polyacrylamide (PAM), or mixtures thereof.

The first suspension may also comprise a crosslinking agent. By adding a crosslinking agent to the first suspension the paper, paperboard or film will have improved barrier properties at high relative humidity (RH) values. Different crosslinking agents can be added such as citric acid, polyisocyanate, metal ions preferably alkaline earth metal ions, anionic-cationic complex and/or polyelectrolyte complex.

The method according to the invention may further comprise the step of applying a surface size, a foam coating and/or a dispersion coating comprising a polymer to one side of the paper, paperboard or film, preferably to the second side of the paper, paperboard or film. The applied coatings, e.g. surface size, foam coating or dispersion coating makes it possible to produce a paper, paperboard or film with improved barrier properties. The paper, paperboard or film comprising a surface size, a foam coating or a dispersion coating can have improved heat-sealing properties and/or water resistance and moisture barrier properties. The polymer of the surface size, foam coating or dispersion coating is preferably a thermoplastic polymer such as polyethylene (PE), ethylene copolymers, acrylate based binders such as methacrylate based binders, styrene based binders e.g. styrene-olefin copolymers, vinyl based binders, e.g. PVC. The coating may also comprise additives that will further improve the heat sealability properties. Example of additives in the coating are waxes, antislip agents (e.g. PE waxes, carnauba waxes), inorganic fillers or pigments for antiblock, for haptic/optical, for viscosity control e.g. silica, talc, PCC, anti-oxidants, UV stabilizers, optical brightening agents (OBA), antifoaming agents and/or adhesion promoters. The coating is preferably added in a single step to form a single layer coating but it could also be added in more than one layer to form a multi-layer coating.

The method according to the invention may further comprise the step of applying a polymer layer to the side of the paper, paperboard or film that has not been in direct contact with the drying equipment, i.e. the second side of the paper, paperboard or film, either through lamination of a polymer film or by extrusion coating of a polymer. The addition of a polymer layer makes it possible to produce a paper, paperboard or film with good barrier properties with heat-sealing properties at a low cost. The polymer is preferably a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. By using for instance PLA as the thermoplastic polymer the product may be formed completely from biodegradable materials.

According to one embodiment the production speed through the direct drying equipment is about 100 m/min.

The present invention also relates to a coated paper or paperboard product obtained by the method described above.

The present invention also relates to a coated film comprising microfibrillated cellulose obtained by the method described above.

The coated MFC film preferably has a grammage below 45 gsm, preferably below 35 gsm or even more preferably below 30 gsm. It is preferred that the grammage of the film is between 10-40 gsm, even more preferably between 10-30 gsm.

The density of the coated film is above preferably above 700 g/m$^3$, preferably between 700-1400 g/m$^3$. It is surprising that it is possible to dry a MFC film with such high density using high temperatures in a direct drying equipment.

The coated film preferably has an Oxygen Transmission Rate (OTR) value (23° C., 50% RH) below 100 cc/m$^2$*day*atm according to ASTM D-3985. Thus, the MFC film produced has very good oxygen barrier properties.

The coated film preferably a tear resistance above 2.0 Nm$^2$/g measured as the geometric MD/CD mean value according to ISO 1974 (Elmendorf method).

The first side of the coated film preferably has a surface roughness PPS value below 2 µm according to ISO 8791-4, even more preferably below 1.5 µm and most preferred below 1 µm. It has been found that it is possible to produce a film having a very smooth surface by the present invention. If a metal layer, such an aluminum layer should be attached to the film, the surface smoothness is of great importance. Consequently, the MFC film according to the present invention is suitable to applying metal layers to the first surface of the film.

The MFC film according to the present invention may be used as bag in boxes when packaging dry food such as cereals, as a wrapping substrate, as a laminate material in paper, paperboard or plastics and/or as a substrate for disposable electronics.

BRIEF DESCRIPTION OF THE FIGURE

FIG. 1: Shows a schematic overview of the process according to the invention.

DETAILED DESCRIPTION OF THE FIGURE

FIG. 1 shows a schematic overview of the process according to the present invention. The first suspension (1) comprising cellulose fibers, e.g. microfibrillated cellulose is conducted to a substrate (2) on which a fibrous web (3) is formed. The substrate (2) is preferably a porous wire of a paper or paperboard machine. The substrate (2) and the fibrous web (3) is conducted through a drying equipment (4). To the surface (5) of the drying equipment is a second suspension (6) added. The second suspension is then applied onto the first side of fibrous web (3) which is the side in contact (via the coating of the second suspension) with the drying equipment (4). In this way a coated paper, paperboard or film is produced in a very easy and efficient way.

EXAMPLE

A first suspension comprising kraft pulp fibers were applied to a substrate to form a fibrous web. The fibrous web had a grammage about 60 gsm. A second suspension comprising 100% by weight of microfibrillated cellulose with a consistency of 4.5% by weight was added as a thin layer to a heated smooth metal surface. The temperature of the metal surface was about 150° C. The drying of the microfibrillated cellulose layer was started as water evaporated off from the heated metal surface. When the microfibrillated layer was still moist, the fibrous web was brought into contact with the microfibrillated cellulose layer located on the heated surface. Pressure was applied to ensure good contact between the fibrous web and the microfibrillated cellulose layer and to ensure that no wrinkles occurred.

After drying the coated paper product was easy to peel off the metal surface.

The resulted coated paper product had a very glossy and smooth surface. The surface visually looked like a polymer coated product. Consequently, the process according to the present invention made it possible to produce a coated paper product having good barrier properties as well as strength properties.

In view of the above detailed description of the present invention, other modifications and variations will become apparent to those skilled in the art. However, it should be apparent that such other modifications and variations may be effected without departing from the spirit and scope of the invention.

The invention claimed is:
1. A method for the production of a coated paper, paperboard or film, wherein the method comprises the steps of:
   providing a first suspension comprising cellulose fibers,
   applying the first suspension on a substrate to form a fibrous web, wherein the web has a first and a second side,
   providing a second suspension comprising microfibrillated cellulose,
   applying the second suspension to a surface of a drying equipment, wherein the second suspension comprises 70 weight-% to 100 wt-% of microfibrillated cellulose based on total dry weight of the suspension, and conducting said fibrous web through the drying equipment whereby the second suspension is added to the first side of the web forming the coated paper, paperboard or film.

2. The method according to claim 1 wherein the first suspension comprises between 0.01 weight-% to 20 weight-% of microfibrillated cellulose based on total dry weight of the suspension.

3. The method according to claim 2 wherein the microfibrillated cellulose of the first suspension has a Schopper-Riegler value below 90.

4. The method according to claim 1, wherein the first suspension comprises between 70 weight-% to 100 weight-% of microfibrillated cellulose based on total dry weight of the suspension.

5. The method according to claim 1 wherein the second suspension comprises microfibrillated cellulose with a Schopper-Riegler value above 95.

6. The method according to claim 1 wherein the second suspension is applied in an amount that a coating having a grammage of 0.1-8 gsm is formed.

7. The method according to claim 1 wherein the method further comprises the step of dewatering the formed fibrous web to a dry content of 25-90 wt-% before the web is conducted through the drying equipment.

8. The method according to claim 1 wherein the drying equipment used is a contact drying equipment such as a Yankee drying cylinder, a metal belt dryer, plastic belt dryer or a Condebelt drying equipment.

9. The method according to claim 1 wherein the method further comprises the step of applying a surface size, a foam coating and/or a dispersion coating comprising a polymer to the side of the paper, paperboard or film that has not been in direct contact with the contact drying equipment.

10. The method according to claim 1 wherein the method further comprises the step of applying a polymer layer to the side of the paper, paperboard or film that has not been in direct contact with the contact drying equipment, either through lamination of a polymer film or by extrusion coating of a polymer.

11. The process according to claim 1, wherein the coated paper, paperboard or film has a coating with a grammage of 0.3 to 4 gsm.

* * * * *